United States Patent
Stoschek et al.

(10) Patent No.: US 9,846,051 B2
(45) Date of Patent: Dec. 19, 2017

(54) NAVIGATION SYSTEM FOR A MOTOR VEHICLE

(71) Applicant: VOLKSWAGEN AG, Wolfsburg (DE)

(72) Inventors: Arne Stoschek, Palo Alto, CA (US); Brian Ng, Los Altos, CA (US); Philippe Alessandrini, Palo Alto, CA (US); Daniel Rosario, Palo Alto, CA (US)

(73) Assignee: VOLKSWAGEN AG, Wolfsburg (DE)

( * ) Notice: Subject to any disclaimer, the term of this patent is extended or adjusted under 35 U.S.C. 154(b) by 297 days.

(21) Appl. No.: 13/953,398

(22) Filed: Jul. 29, 2013

(65) Prior Publication Data
US 2013/0311082 A1 Nov. 21, 2013

Related U.S. Application Data

(62) Division of application No. 11/395,705, filed on Mar. 31, 2006, now abandoned.

(51) Int. Cl.
G01C 21/36 (2006.01)
G01S 5/00 (2006.01)
G01C 21/32 (2006.01)
G08G 1/0969 (2006.01)

(52) U.S. Cl.
CPC ......... *G01C 21/3635* (2013.01); *G01C 21/32* (2013.01); *G01C 21/3638* (2013.01); *G01S 5/0009* (2013.01); *G01S 5/0045* (2013.01); *G08G 1/0969* (2013.01)

(58) Field of Classification Search
CPC .............. G01C 21/32; G01C 21/3635; G01C 21/3638; G01S 5/0009; G01S 5/0045; G08G 1/0969

USPC ................. 701/451, 482, 483, 484
See application file for complete search history.

(56) References Cited

U.S. PATENT DOCUMENTS

| 5,508,917 A | 4/1996 | Siegle et al. |
| 5,839,086 A | 11/1998 | Hirano |
| 6,148,261 A | 11/2000 | Obradovich et al. |
| 6,157,155 A | 12/2000 | Kobayashi |

(Continued)

FOREIGN PATENT DOCUMENTS

| CN | 1304120 A | 7/2001 |
| DE | 40 39 887 | 6/1992 |

(Continued)

OTHER PUBLICATIONS

Pioneer Operation Manual, DVD Navigation Unit AVIC-90DVD, Published by Pioneer Corporation 2002, Cover Page, pp. 21, 37-42, 57, 58 and 102.*

(Continued)

*Primary Examiner* — Dale Hilgendorf
(74) *Attorney, Agent, or Firm* — Andrews Kurth Kenyon LLP (57) ABSTRACT

A navigation system for a motor vehicle includes: an off-board navigation system spatially separated from the motor vehicle, for calculating a suggested route for the motor vehicle; a wireless communication connection between the off-board navigation system and the motor vehicle, for transmitting the suggested route to the motor vehicle; and a man-machine interface arranged in the motor vehicle, for outputting the suggested route to an operator of the motor vehicle.

13 Claims, 9 Drawing Sheets

(56) References Cited

U.S. PATENT DOCUMENTS

| | | | |
|---|---|---|---|
| 6,285,317 B1* | 9/2001 | Ong | 342/357.57 |
| 6,324,467 B1 | 11/2001 | Machii et al. | |
| 6,336,073 B1 | 1/2002 | Ihara et al. | |
| 6,647,270 B1 | 11/2003 | Himmelstein | |
| 6,694,255 B1 | 2/2004 | Kainuma et al. | |
| 6,700,504 B1 | 3/2004 | Aslandogan et al. | |
| 6,707,378 B2 | 3/2004 | MacNeille et al. | |
| 6,745,111 B2 | 6/2004 | Maruyama et al. | |
| 6,765,495 B1 | 7/2004 | Dunning et al. | |
| 6,826,472 B1 | 11/2004 | Kamei et al. | |
| 6,862,524 B1 | 3/2005 | Nagda et al. | |
| 6,865,480 B2* | 3/2005 | Wong | 701/431 |
| 6,868,331 B2 | 3/2005 | Hanebrink | |
| 6,898,516 B2 | 5/2005 | Pechatnikov et al. | |
| 6,965,829 B2 | 11/2005 | Yamadaji et al. | |
| 6,996,469 B2* | 2/2006 | Lau et al. | 701/418 |
| 7,046,168 B2 | 5/2006 | Tsuboi | |
| 7,062,375 B2 | 6/2006 | Hatano | |
| 7,103,368 B2 | 9/2006 | Teshima | |
| 7,110,882 B2 | 9/2006 | Moser et al. | |
| 7,233,864 B2 | 6/2007 | Moser et al. | |
| 7,269,503 B2 | 9/2007 | McGrath | |
| 7,272,357 B2 | 9/2007 | Nishiga et al. | |
| 7,272,497 B2* | 9/2007 | Koshiji et al. | 701/455 |
| 7,286,825 B2 | 10/2007 | Shishido et al. | |
| 7,383,123 B2 | 6/2008 | Park | |
| 2001/0019309 A1 | 9/2001 | Saeki et al. | |
| 2001/0020211 A1 | 9/2001 | Takayama et al. | |
| 2001/0020213 A1 | 9/2001 | Hatano | |
| 2002/0032035 A1 | 3/2002 | Teshima | |
| 2002/0045455 A1 | 4/2002 | Spratt | |
| 2002/0177948 A1* | 11/2002 | Upparapalli et al. | 701/209 |
| 2003/0028314 A1 | 2/2003 | Nagamune | |
| 2003/0083809 A1 | 5/2003 | Hatano | |
| 2003/0102997 A1 | 6/2003 | Levin et al. | |
| 2003/0234720 A1 | 12/2003 | MacNeille et al. | |
| 2004/0015292 A1 | 1/2004 | Wiio et al. | |
| 2004/0064245 A1* | 4/2004 | Knockeart et al. | 701/117 |
| 2004/0066330 A1* | 4/2004 | Knockeart et al. | 342/357.07 |
| 2004/0082350 A1 | 4/2004 | Chen et al. | |
| 2004/0093958 A1 | 5/2004 | Brandt | |
| 2004/0150534 A1 | 8/2004 | Linn | |
| 2004/0193371 A1* | 9/2004 | Koshiji et al. | 701/211 |
| 2004/0204848 A1* | 10/2004 | Matsuo et al. | 701/211 |
| 2004/0230370 A1 | 11/2004 | Tzamaloukas | |
| 2004/0249565 A1 | 12/2004 | Park | |
| 2005/0065721 A1* | 3/2005 | Herrtwich et al. | 701/207 |
| 2005/0197842 A1 | 9/2005 | Bergmann et al. | |
| 2005/0216147 A1 | 9/2005 | Ferman | |
| 2005/0222760 A1 | 10/2005 | Cabral et al. | |
| 2005/0248484 A1 | 11/2005 | Stoschek et al. | |
| 2005/0270311 A1* | 12/2005 | Rasmussen et al. | 345/677 |
| 2006/0074549 A1* | 4/2006 | Takahashi et al. | 701/207 |
| 2006/0074553 A1* | 4/2006 | Foo et al. | 701/212 |
| 2006/0161341 A1 | 7/2006 | Haegebarth et al. | |
| 2006/0164412 A1 | 7/2006 | Dupont et al. | |
| 2006/0200312 A1* | 9/2006 | Osaka | 701/211 |
| 2007/0093958 A1 | 4/2007 | Jonsson et al. | |
| 2007/0115433 A1 | 5/2007 | Saso et al. | |
| 2007/0138347 A1 | 6/2007 | Ehlers | |
| 2007/0233369 A1 | 10/2007 | Ng et al. | |
| 2007/0233371 A1 | 10/2007 | Stoschek et al. | |
| 2007/0233375 A1 | 10/2007 | Garg et al. | |
| 2007/0233377 A1 | 10/2007 | Salay et al. | |
| 2007/0271035 A1 | 11/2007 | Stoschek et al. | |
| 2008/0065322 A1 | 3/2008 | Ng et al. | |
| 2008/0133132 A1* | 6/2008 | Jung et al. | 701/212 |
| 2008/0201070 A1* | 8/2008 | Kikuchi | 701/209 |
| 2008/0249703 A1* | 10/2008 | Matsuno et al. | 701/201 |

FOREIGN PATENT DOCUMENTS

| | | |
|---|---|---|
| DE | 44 46 779 | 6/1996 |
| DE | 100 14 954 | 10/2001 |
| DE | 100 53 373 | 5/2002 |
| DE | 101 12 892 | 10/2002 |
| DE | 698 15 940 | 6/2004 |
| DE | 103 12 792 | 8/2004 |
| DE | 103 12 284 | 10/2004 |
| DE | 103 38 852 | 3/2005 |
| DE | 103 39 340 | 4/2005 |
| DE | 103 49 242 | 4/2005 |
| DE | 103 44 144 | 5/2005 |
| DE | 10 2004 061 782 | 9/2005 |
| DE | 10 2005 013 648 | 9/2006 |
| EP | 0 243 635 | 1/1993 |
| EP | 0 694 895 | 1/1996 |
| EP | 0 875 730 | 11/1998 |
| EP | 0 990 119 | 4/2000 |
| EP | 1 033 692 | 9/2000 |
| EP | 1 035 531 | 9/2000 |
| EP | 1 168 286 | 1/2002 |
| EP | 1 376 059 | 1/2004 |
| EP | 1 757 904 | 2/2007 |
| EP | 1 681 663 B1 | 8/2007 |
| FR | 2 634 707 | 2/1990 |
| GB | 2 100 069 | 12/1982 |
| JP | 06 036186 | 2/1994 |
| JP | 10 241094 | 9/1998 |
| JP | 2000-357296 A | 12/2000 |
| JP | 2002-131065 | 5/2002 |
| JP | 2004-227162 | 8/2004 |
| JP | 2005-286557 A | 10/2005 |
| WO | 92/17929 | 10/1992 |
| WO | 98/59215 | 12/1998 |
| WO | 00/22593 A1 | 4/2000 |
| WO | 2005/004079 | 1/2005 |
| WO | 2005/124280 | 12/2005 |

OTHER PUBLICATIONS

Patent Board Decision Action for U.S. Appl. No. 11/395,705 (6 pages).*

International Preliminary Report on Patentability, issued in corresponding Int'l. Appln. No. PCT/EP2004/013280, filed Nov. 23, 2004.

Written Opinion, issued in corresponding Int'l. Appln. No. PCT/EP2004/013280, dated Nov. 23, 2004.

International Search Report, issued in corresponding Int'l. Appln. No. PCT/EP2004/013280, dated Nov. 23, 2004.

PCT International Search Report and Written Opinion of the International Searching Authority, PCT International Patent Application No. PCT/EP2007/001905, dated Sep. 12, 2007, (English-language translation provided).

Periodical Autoconnect 2005, Vereinigte Motor-Verlage GmbH & Co. KG (United Motor publishing house, Inc.), Leuschnerstr. 1, 70174 Stuttgart, Federal Republic of Germany, pp. 18 and 21.

Bleyer et al., "Car-to-Car Communication," p. 16-19, Apr. 2002. (Translated).

PCT International Search Report and Written Opinion, PCT International Application No. PCT/EP2007/001906, dated Jun. 14, 2007 (English-language translation provided).

International Search Report, PCT International Patent Application No. PCT/EP2007/001904, dated Jun. 21, 2007.

Written Opinion of the International Searching Authority, PCT International Patent Application No. PCT/EP2007/001904, dated Jun. 21, 2007, (English-language translation provided).

Office Action, dated Aug. 30, 2010, issued in corresponding U.S. Appl. No. 11/439,915.

Office Action, dated Dec. 7, 2010, issued in corresponding U.S. Appl. No. 11/439,915.

Office Action, dated Oct. 13, 2010, issued in corresponding U.S. Appl. No. 11/501,554.

International Search Report and Written Opinion, dated Sep. 30, 2008, issued in corresponding International Application No. PCT/EP2007/002423.

* cited by examiner

NAVIGATION SYSTEM FOR A MOTOR VEHICLE

CROSS REFERENCE TO RELATED APPLICATION

The present application is a divisional application of U.S. patent application Ser. No. 11/395,705, filed on Mar. 31, 2006, which is incorporated herein in its entirety by reference thereto.

FIELD OF THE INVENTION

The present invention relates to a navigation system for a motor vehicle. The present invention also relates to a motor vehicle having a navigation system, which may include a position-finding system adapted to determine a position of the motor vehicle.

BACKGROUND INFORMATION

European Published Patent Application No. 0 875 730 and German Published Patent Application No. 698 15 940 describe a map data display device for use in a vehicle navigation device having a data-conversion device for recording points of map data according to a map, from a viewpoint line through a viewing line originating from the viewpoint and having an angle of depression with respect to the plane of the map, and for perspectively projecting the points of the map data onto a viewing plane, which is fixed perpendicularly to the viewing line and is a predefined distance from the location, in order to generate map display data.

This produces a bird's-eye view of an environment. A navigation system having a bird's-eye view of an environment is also described in French Published Patent Application No. 2 634 707 and the periodical Autoconnect 2005, Vereinigte Motor-Verlage GmbH & Co. KG (United Motor Publishing House, Inc.), Leuschnerstr. 1, 70174 Stuttgart, Federal Republic of Germany, pages 18 and 21.

European Published Patent Application No. 0 990 119 describes a digital personal communication device having a processor, a memory that the device can access, and a display that is connected to the processor. The display displays map data and a position of the digital personal communication device with respect to the map data, and the map data includes route points, i.e., coordinates, as instructed by the processor. Furthermore, the digital personal communication device includes an input device for forming queries for map information and for selecting route points, and a GPS receiver that is connected to the processor. The processor is programmed to process data it receives from the GPS receiver such that the position of the digital personal communication device is able to be determined from the data. Moreover, the digital personal communication device includes a transmitter that is connected to the processor, the processor being programmed such that, utilizing the transmitter, it requests map data from a map memory and a transmission device, processes the map information it obtained from the map memory and the transmission device, and determines the availability of additional stored data regarding route points in the memory during the selection of one of the route points by the input device, and, using the transmitter, it requests additional stored data from the map memory and the transmission device during the selection of one of the route points if additional, stored data are not available in the memory.

SUMMARY

Example embodiments of the present invention provide a motor vehicle having a navigation system.

The navigation system may include an off-board navigation system spatially separated from the motor vehicle, for calculating a suggested route for the motor vehicle, a wireless communication connection between the off-board navigation system and the motor vehicle, for transmitting the suggested route to the motor vehicle, and a man-machine interface arranged in the motor vehicle, for outputting the suggested route to an operator of the motor vehicle.

A suggested route within the present context may include, for example, a recommended route to a destination and/or information regarding a recommended direction of travel.

Within the present context, a wireless communication connection may also include a non-wireless part. A wireless communication connection within the present context may include, for example, a communication connection that is at least wireless in the direction of the motor vehicle. A wireless communication connection within the present context may include, for example, a wireless connection to the Internet (e.g., WLAN). Wireless communication connections may also include WiFi, WIMAX, RF, mobile radio communication, etc. It may be provided that a selection between alternative wireless communication connections is (e.g., automatically) made as a function of specific criteria. Examples of these criteria include costs, availability, and/or bandwidth, etc. In addition, a seamless transition between online and offline operation may be provided, a suggested route optionally including map data being stored in an on-board memory.

The suggested route may be a function of the current traffic, construction sites, weather and environmental conditions, and/or visibility, etc. The suggested route may also be a function of personal preferences (e.g., interesting routes, landmarks, shopping areas, etc.).

The motor vehicle may include a position-finding system for determining the position of the motor vehicle, the orientation or heading of the motor vehicle, and/or the on-board time, etc. In this context, the position of the motor vehicle, the heading of the motor vehicle, and/or the on-board time to be transmittable to the off-board navigation system via the wireless communication connection may be taken into account. The position of the motor vehicle within the present context may also be a variable, from which the position of the motor vehicle is ascertainable, such as GPS signals received by the motor vehicle. If, for example, the GPS signals received by the motor vehicle are transmitted to the off-board navigation system, then it ascertains the position of the motor vehicle and the heading of the motor vehicle, and possibly the on-board time.

A destination may be input (e.g., via the man-machine interface). This destination may be transmittable to the off-board navigation system via the wireless communication connection. The destination may be inputted alphanumerically, for example. Alternatively, or in addition, the destination may also be entered via voice input or character recognition (e.g., a character recognition system for identifying Asiatic characters). A location may be selected on a map, a satellite image, and/or a 3-D graphical representation, etc. In this case, a zoom function for the map, the satellite image, and/or the 3-D graphical representation may be provided. It may be provided that an operator of the motor vehicle may search for a particular object (e.g., restaurant, landmark, store, gas station, etc.) in a particular area (e.g., road, city, postal code, district, etc.), and select a navigational destination from the available hits (e.g., in a map, in a satellite image, and/or in a 3-D graphical representation, etc.). The starting point is the current position of the motor vehicle. However, the starting point may also be selectable.

The off-board navigation system may include the functionality of a search engine. This includes, for example: the option of searching online for POI's and locating these on a map, on a satellite image, and/or in a 3-D graphical representation, etc.; the option of searching for stores, shops or restaurants and having a look at the selection or the menu; the option of searching for particular articles and finding stores in which they are offered; the option of storing the preferences, preferred locations, and/or preferred routes of a user; and/or the option of finding interesting routes; etc.

Suitable hits may be put into the suggested route, possibly as destinations.

The suggested route may be displayed in a form integrated into a satellite image or into a three-dimensional graphical representation, and/or transmitted to the motor vehicle in this form, using the off-board navigation system. A satellite image or a 3-D graphical representation may be transmitted from the environment of the motor vehicle to the motor vehicle. The man-machine interface arranged in the motor vehicle may include a display device, e.g., a touch screen, for displaying the suggested route in a form integrated into a/the satellite image or into a/the 3-D graphical representation. In this context, it may be provided that an operator may adjust the viewing angle (e.g., from a plan or overhead view to a first-person view via a bird's-eye view, and vice versa).

With regard to the transmission of the suggested route into a satellite image and/or a 3-D graphical representation or a different set of map data, or with regard to the transmission of satellite images and/or 3-D graphical representations or other sets of map information for displaying the suggested route, the following strategies referred to as predictive catching, tunnel vision, and profile-based prediction may be provided. In the case of predictive catching, only satellite images and/or three-dimensional graphical representations or other map data that are needed are transmitted. If the motor vehicle is in North America, for example, then European map data are not transmitted. In the case of the "tunnel vision" strategy, only satellite images and/or 3-D graphical representations or other map data along the suggested route are transmitted with a high information density. On the other hand, satellite images and/or 3-D graphical representations or other map data on the periphery of the route are transmitted with a low information density. In the case of the "profile-based prediction" strategy, satellite images and/or 3-D graphical representations or other map data are transmitted in a form adjusted to the preferences of an operator.

It may be provided that the operator is offered the option of looking at the suggested route in advance (fly-through mode).

The man-machine interface may include a touch screen or take the form of a touch screen. In this context, e.g., it may be provided that displayed objects are able to be moved with the aid of a drag-and-drop option. A double-tap function may also be provided for implementing a zoom function.

The satellite images may also be superposed or supplemented with additional information, such as streets, street names or designations, buildings, vehicles, traffic information, POI's (optionally customized), call-out boxes, service areas, etc. Special references to service areas or parking areas may be provided, for example, when a specific driving time has been exceeded.

With regard to the satellite images, it may be provided that one is able to select between different modes, such as night mode, day mode, seasonally dependent modes, weather-dependent modes, etc. It may also be provided that a map, a satellite image, and/or a 3-D graphical representation be supplemented with information from on-board sensor technology (night vision, road-condition sensor system), etc.

A follow-me function may also be provided, where the position of another selected motor vehicle is entered on a map, a satellite image, and/or a 3-D graphical representation.

Further information, such as VW garages or facilities that offer special conditions to VW customers, may also be entered on a map, a satellite image, and/or a 3-D graphical representation.

The motor vehicle may additionally include an on-board navigation system for calculating a suggested route for the motor vehicle. In this case, it may be provided that information for the on-board navigation system, such as a road map, one-way streets, house numbers, gas stations, points of interest (POI's), information about long-term construction sites, etc., is updated via the wireless communication connection.

It may be provided that the motor vehicle transmits operating data of the motor vehicle (via the wireless communication connection) or transmits operating data to the off-board navigation system (via the wireless communication connection). In this regard, operating data of the motor vehicle may include the status of the fuel tank level, the oil level, information regarding a defect, etc. If, for example, information is transmitted that the tank is almost empty, then navigation to the next gas station is offered and/or provided. If, for example, the information is transmitted that a specific defect is present, then navigation to the next (e.g., suitable) service station is offered and/or provided.

A motor vehicle, e.g., one including one or more of the above-mentioned features, may include: an interface to a wireless communication connection; a suggested route of an off-board navigation system, which is spatially separated from the motor vehicle and includes, e.g., one or more of the above-mentioned features, being receivable by the motor vehicle via the wireless communication connection; and the motor vehicle including a man-machine interface for outputting the suggested route to an operator of the motor vehicle.

The motor vehicle may additionally include a position-finding system for determining the position of the motor vehicle.

The position of the motor vehicle may be transmittable (e.g., to the off-board navigation system) via the wireless communication connection.

The man-machine interface arranged in the motor vehicle may include a display device for displaying the suggested route.

The motor vehicle may additionally include an on-board navigation system for calculating a suggested route for the motor vehicle.

In a method for supporting the navigation of a motor vehicle, a suggested route is transmitted by an off-board navigation system, which is spatially separated from the motor vehicle and may include, e.g., one or more of the above-mentioned features, to the motor vehicle via a wireless communication connection. The suggested route is outputted to an operator of the motor vehicle.

A satellite image and/or a 3-D graphical representation may be transmitted from the environment of the motor vehicle to the motor vehicle.

The suggested route may be outputted to the operator of the motor vehicle by displaying the suggested route in a form integrated into a satellite image or a 3-D graphical representation.

The position of the motor vehicle may be determined. The position of the motor vehicle may be transmitted by the motor vehicle (e.g., to the off-board navigation system).

A motor vehicle within the present context may include, e.g., a land vehicle that may be used individually in road traffic. Motor vehicles within the present context are not restricted to land vehicles having an internal combustion engine.

Off-road navigation may be provided for.

A navigation system for a motor vehicle may include: an off-board navigation system spatially separated from the motor vehicle adapted to calculate a suggested route for the motor vehicle; a wireless communication connection between the off-board navigation system and the motor vehicle adapted to transmit the suggested route to the motor vehicle; and a man-machine interface arranged in the motor vehicle adapted to output the suggested route to an operator of the motor vehicle.

The motor vehicle may include a position-finding system adapted to determine a position of the motor vehicle.

The wireless communication connection may be adapted to transmit the position of the motor vehicle to the off-board navigation system.

The man-machine interface may be adapted to display the suggested route in a form integrated into at least one of (a) a satellite image and (b) a 3-D graphical representation, and the off-board navigation system may be adapted to transmit the suggested route to the motor vehicle in the form integrated into the at least one of (a) the satellite image and (b) the 3-D graphical representation.

The man-machine interface may include a display device adapted to display the suggested route in the form integrated into the at least one of (a) the satellite image and (b) the 3-D graphical representation.

At least one of (a) a satellite image and (b) a 3-D graphical representation may be transmittable from an environment of the motor vehicle to the motor vehicle.

The man-machine interface may include a display device adapted to display the suggested route in a form integrated into the at least one of (a) the satellite image and (b) the 3-D graphical representation.

The motor vehicle may include an on-board navigation system adapted to calculate a suggested route for the motor vehicle.

A navigation system for a motor vehicle may include: a wireless communication connection between an off-board navigation system, spatially separated from the motor vehicle adapted to calculate a suggested route for the motor vehicle, and the motor vehicle adapted to transmit the suggested route to the motor vehicle; and a man-machine interface arranged in the motor vehicle adapted to output the suggested route to an operator of the motor vehicle.

A motor vehicle may include: an interface to a wireless communication connection, a suggested route of an off-board navigation system spatially separated from the motor vehicle receivable by the motor vehicle via the wireless communication connection; and a man-machine interface adapted to output the suggested route to an operator of the motor vehicle.

The motor vehicle may include a position-finding system adapted to determine a position of the motor vehicle.

The position of the motor vehicle may be transmittable to the off-board navigation system by the wireless communication connection.

The man-machine interface may include a display device adapted to display the suggested route.

The motor vehicle may include an on-board navigation system adapted to calculate a suggested route for the motor vehicle.

A method for supporting navigation of a motor vehicle may include: transmitting a suggested route from an off-board navigation system spatially separated from the motor vehicle to the motor vehicle via a wireless communication connection; and outputting the suggested route to an operator of the motor vehicle.

The suggested route may be output to the operator of the motor vehicle in the outputting step by displaying the suggested route in a form integrated into at least one of (a) a satellite image and (b) a 3-D graphical representation.

The method may include transmitting at least one of (a) a satellite image and (b) a 3-D graphical representation from an environment of the motor vehicle to the motor vehicle.

The suggested route may be output to the operator of the motor vehicle in the outputting step by displaying the suggested route in a form integrated into the at least one of (a) the satellite image and (b) the 3-D graphical representation.

The method may include determining a position of the motor vehicle.

The method may include transmitting the position of the motor vehicle from the motor vehicle to the off-board navigation system.

Further aspects and details of example embodiments of the present invention are described in more detail below with reference to the appended Figures.

DETAILED DESCRIPTION

Figure 1:
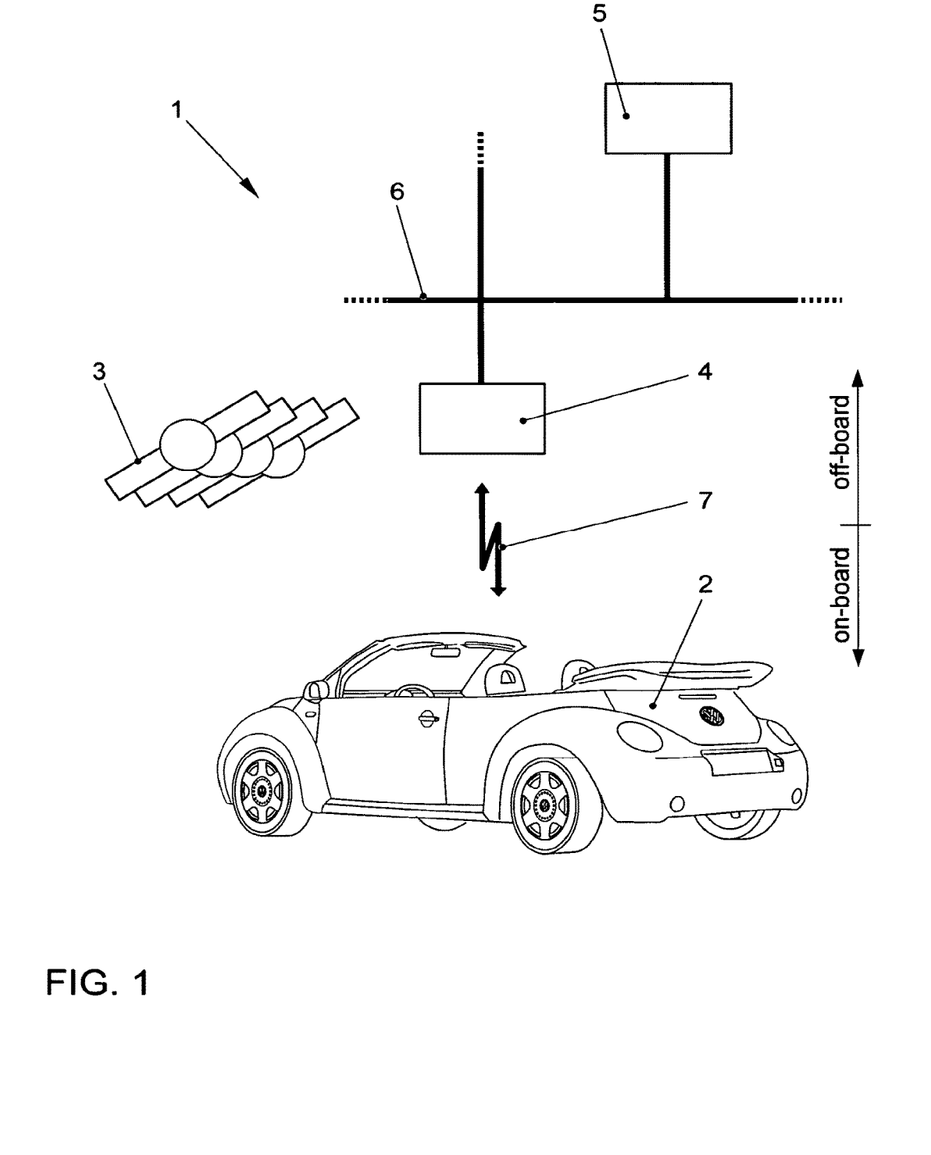
FIG. 1 schematically illustrates a navigation system for a motor vehicle.
Figure 2:
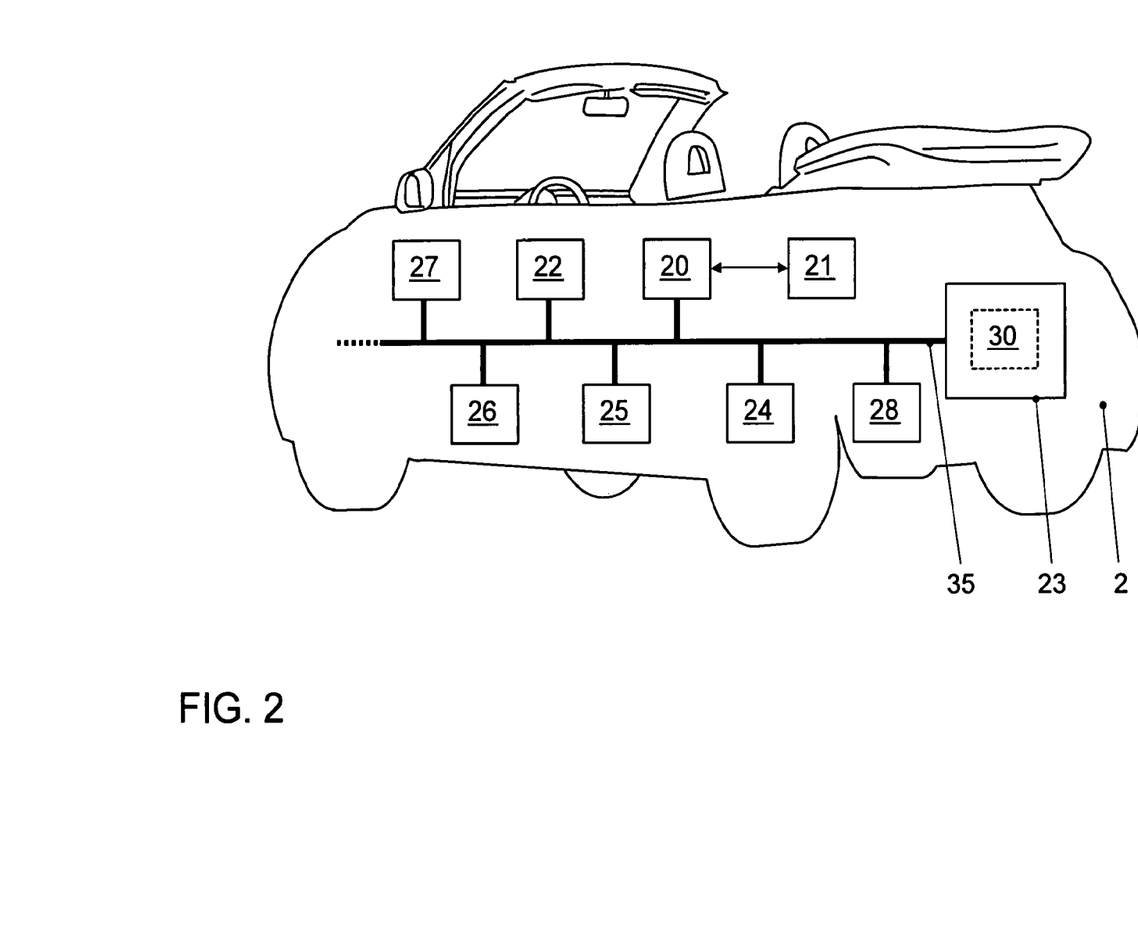
FIG. 2 schematically illustrates a motor vehicle including a navigation system.

FIG. 1 schematically illustrates a navigation system 1 for a motor vehicle 2 illustrated in more detail in FIG. 2. Navigation system 1 includes an off-board navigation system 5 spatially separated from motor vehicle 2, for calculating a suggested route (e.g., recommended route to a destination and/or information regarding a recommended direction of travel) for motor vehicle 2. Motor vehicle 2 may communicate with off-board navigation system 5 via a node 4, using a wireless communication connection 7 and a communication network 6. Both wireless communication connection 7 and the combination of wireless communication connection 7 and communication network 6 may be an example of a wireless communication connection. Wireless communication connection 7 may be WLAN, WiFi, WiMAX, RF, mobile radio, etc. It may be provided that a selection between alternative wireless communication connections is (e.g., automatically) made as a function of certain criteria. Examples of these criteria include costs, availability, and/or bandwidth, etc. The suggested route may be a function of current traffic, construction sites, weather and environmental conditions, and/or visibility, etc. The suggested route may also be a function of personal preferences (e.g., interesting routes, landmarks, shopping areas, etc.).

Motor vehicle 2 includes a man-machine interface taking the form of, e.g., a touch screen 21, for outputting the suggested route to an operator of motor vehicle 2. To this end, touch screen 21 is controllable via a display control unit 20, which is connected by a bus system 35 to an interface 22 for wireless communication connection 7. Touch screen 21 may also be used for operating an infotainment system 24, a telephone 25, or a climate control system 26, etc.

Motor vehicle 2 includes a position-finding system 30, e.g., integrated into an on-board navigation system 23, for determining the position of motor vehicle 2, the heading of motor vehicle 2, and/or the on-board time as a function of signals transmitted by satellites 3. The position of motor vehicle 2, the heading of motor vehicle 2, and/or the on-board time are transmittable to off-board navigation system 5 via wireless communication connection 7. The position of motor vehicle 2 may also be a variable from which the position of motor vehicle 2 is ascertainable, such as GPS signals received by motor vehicle 2. If, for example, the GPS signals received by the motor vehicle are transmitted to off-board navigation system 5, then it ascertains the position of motor vehicle 2 and the heading of motor vehicle 2, and possibly the on-board time.

Using touch screen 21, a destination may be input which is transmittable to off-board navigation system 5 via wireless communication connection 7. Off-board navigation system 5 ascertains the suggested route as a function of the position of motor vehicle 2 and transmits the suggested route to motor vehicle 2 via wireless communication connection 7.

The suggested route is displayable in a form integrated into a satellite image or a 3-D graphical representation, e.g., with the aid of off-board navigation system 5, and/or transmittable in this form to the motor vehicle and displayable via touch screen 21. In this context, it may be provided that an operator may adjust the viewing angle (e.g., from a plan view to a first-person view via a bird's-eye view, and vice versa).

With regard to the transmission of the suggested route into a satellite image and/or a 3-D graphical representation or a different set of map data, or with regard to the transmission of satellite images and/or 3-D graphical representations or other sets of map information, the following strategies referred to as predictive catching, tunnel vision, and profile-based prediction may be provided for displaying the suggested route. In the case of predictive catching, only satellite images and/or three-dimensional graphical representations or other map data that are needed are transmitted. In the case of the "tunnel vision" strategy, only satellite images and/or 3-D graphical representations or other map data along the suggested route are transmitted with a high information density. On the other hand, satellite images and/or 3-D graphical representations or other map data on the periphery of the route are transmitted with a lower information density. In the case of the "profile-based prediction" strategy, satellite images and/or 3-D graphical representations or other map data are transmitted in a form adjusted to the preferences of an operator. The suggested route and the satellite images and/or the 3-D graphical representations or other map data may be stored in a memory denoted by reference numeral 28.

With regard to the satellite images, it may be provided that one is able to select between different modes, such as night mode, day mode, seasonally dependent modes, weather-dependent modes, etc. It may also be provided that a map, a satellite image, and/or a 3-D graphical representation be supplemented with information from on-board sensor system 27 (e.g., night vision, road-condition sensor system, etc.).

Figure 3:
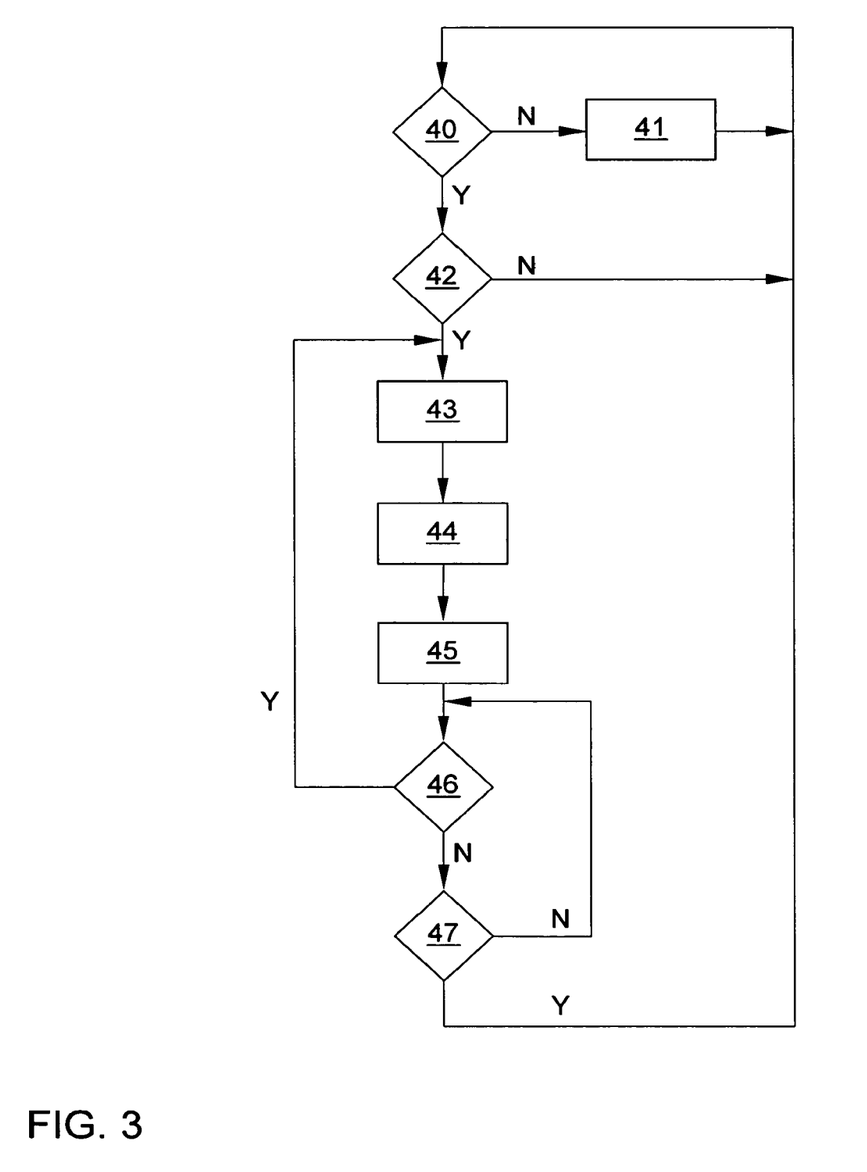
FIG. 3 illustrates a method for supporting navigation of a motor vehicle.

FIG. 3 illustrates a method sequence for supporting navigation of motor vehicle 2, e.g., a method sequence for operating navigation system 1. The method sequence starts with an inquiry 40 as to whether communication connection 7 to off-board navigation system 5 is available. If communication connection 7 to off-board navigation system 5 is not available, then inquiry 40 is followed by a step 41, which allows the operation of the on-board navigation system. However, if communication connection 7 to off-board navigation system 5 is available, then inquiry 40 is followed by an inquiry 42 as to whether a destination is being entered.

If a destination is not entered, then inquiry 42 is followed once more by inquiry 40. However, if a destination is entered, then inquiry 42 is followed by a step 43, in which the position of motor vehicle 2 is determined, and in which the desired destination and the position of motor vehicle 2 are transmitted to off-board navigation system 5. Step 43 is followed by a step 44, in which a suggested route is ascertained and transmitted to motor vehicle 2 with the aid of off-board navigation system 5. Step 44 is followed by a step 45, in which the suggested route is displayed by touch screen 21.

Step 45 is followed by an inquiry 46 as to whether the suggested route should be recalculated and can be calculated (e.g., on the basis of existing communication connection 7). If the suggested route should be recalculated and can be recalculated, then inquiry 46 is followed by step 43. Otherwise inquiry 46 is followed by an inquiry 47 as to whether the method sequence should be interrupted. If the method sequence should be interrupted, then inquiry 46 is followed by inquiry 40. Otherwise, inquiry 47 is followed by inquiry 46.

Figure 4:
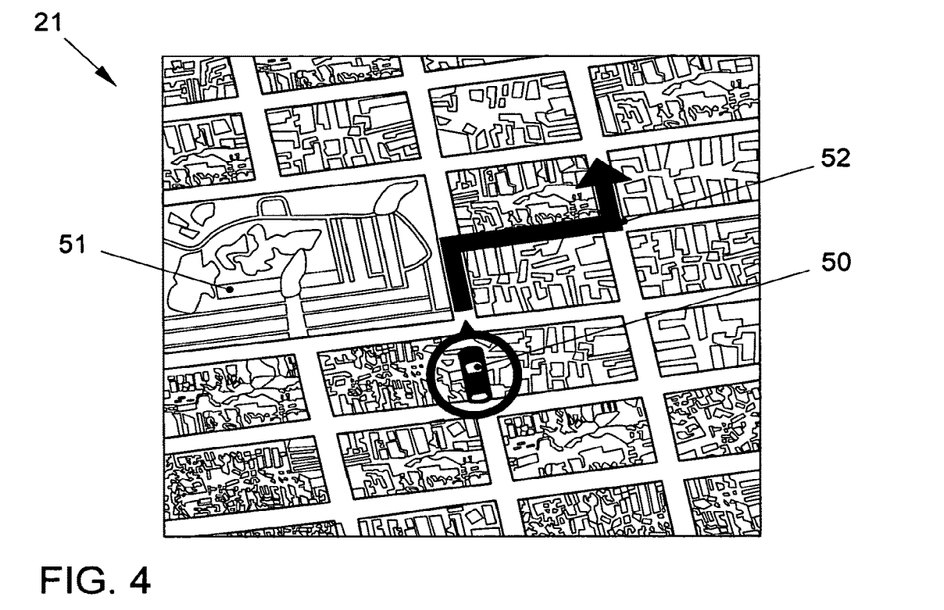
FIG. 4 illustrates a display of a route integrated into a satellite image, via a touch screen.
Figure 5:
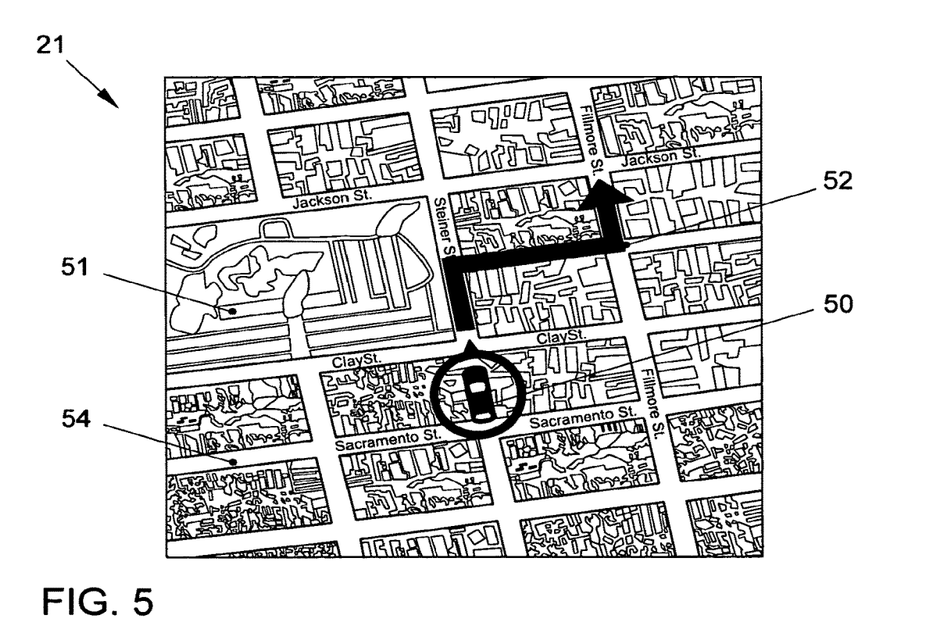
FIG. 5 illustrates a display of a route integrated into a satellite image, via a touch screen.

FIG. 4 illustrates a touch screen 21 in a situation in which marking 50 and route 52 are displayed together with, or in satellite image 51. FIG. 5 illustrates touch screen 21 in a situation in which marking 50, route 52, and streets 54 are displayed together with, or in satellite image 51.

Figure 6:
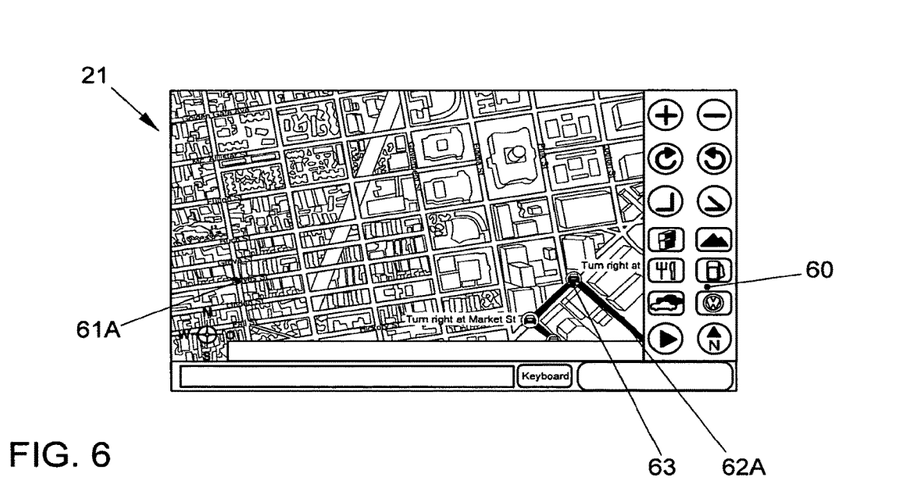
FIG. 6 illustrates a plan or overhead view of a route integrated into a 3-D graphical representation, via a touch screen.
Figure 7:
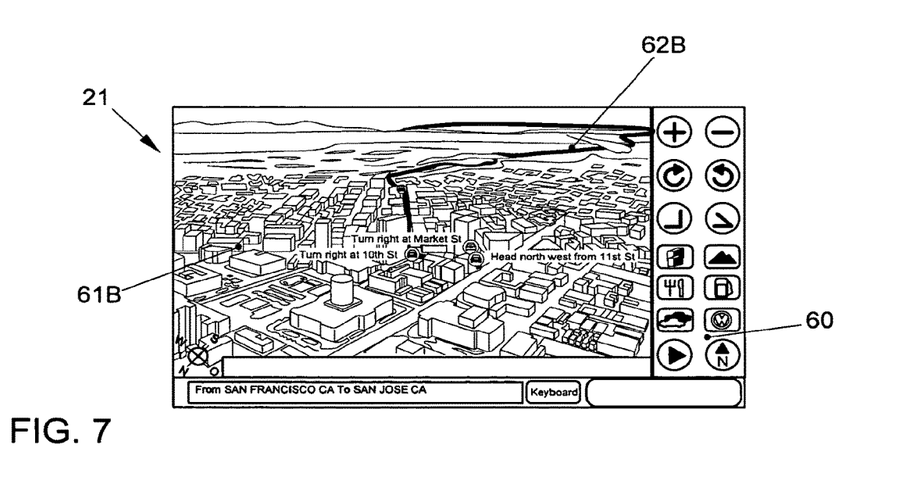
FIG. 7 illustrates a bird's-eye view of a route integrated into a 3-D graphical representation, via a touch screen.

FIG. 6 illustrates a plan view 61A of a suggested route 62A integrated into a 3-D graphical representation, via touch screen 21. Additional information, such as points of interest (POI's) 63, may also be plotted in this representation. In addition to plan view 61A of the three-dimensional graphical representation, an operator bar or toolbar 60 is displayed. With the aid of this toolbar 60, the display may be changed, and/or other and/or additional functions may be activated or controlled. Thus, toolbar 60 may be used to change plan view 61A of the 3-D graphical representation, selected in FIG. 6, into a bird's-eye view 61B, as illustrated in FIG. 7. Accordingly, suggested route 62B is displayed in a form integrated in the bird's-eye view.

Figure 8:
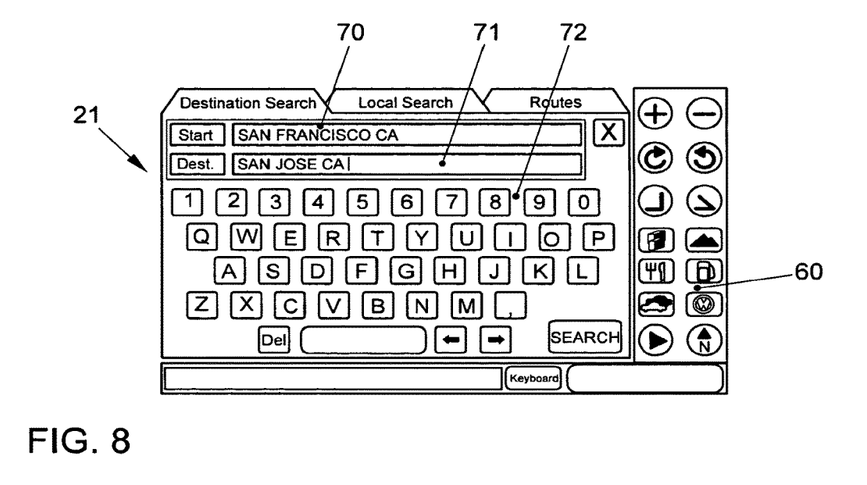
FIG. 8 illustrates a display of an input mask for inputting a starting point and a destination with the aid of a touch screen.

FIG. 8 illustrates a display of an input mask for inputting a starting point and a destination with the aid of touch screen 21. To this end, a starting-point input field 70 and a destination input field 71 are provided. A destination may be entered, e.g., alphanumerically, using a displayed keyboard 72. Alternatively, or in addition, the destination may also be entered via voice input or character recognition (e.g., a character recognition system for identifying, e.g., Asiatic, characters). A location may be selected on a map, a satellite image, and/or a 3-D graphical representation. In this case, a zoom function for the map, the satellite image, and/or the 3-D graphical representation may be provided. The starting position may also be the current position of motor vehicle 2.

Figure 9:
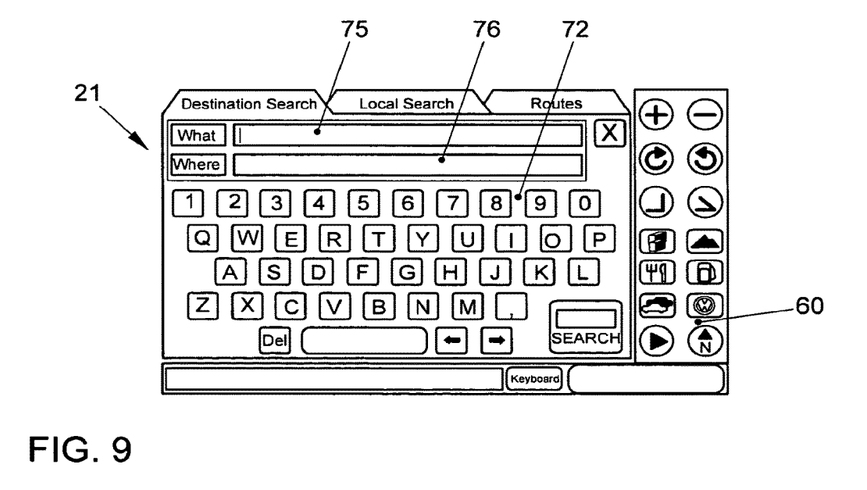
FIG. 9 illustrates a display of an input mask for selecting a destination via a touch screen.

As illustrated in FIG. 9, it may also be provided that an operator of motor vehicle 2 is able to search for a particular object (e.g., restaurant, landmark, store, gas station, etc.) in a particular search area (e.g., street, city, postal code, district, etc.). To this end, an input mask having an object-input field 75 for inputting an object to be searched for (e.g., restaurant, landmark, store, gas station, etc.) and an area-input field 76 for inputting the search area (e.g., street, city, postal code, district, etc.) are displayed. The operator may select a hit from the hits ascertained with the aid of this search and offered or provided with the aid of this search (e.g., in a map, in a satellite image, and/or in a 3-D graphical representation, etc.).

Figure 10:
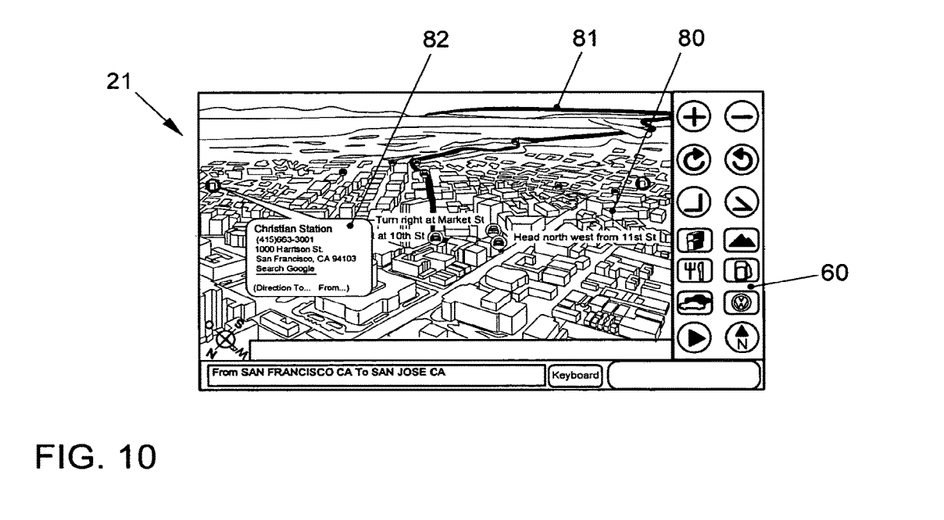
FIG. 10 illustrates a display for selecting preferred routes with the aid of a touch screen.

If the destination is entered via voice input, then the voice input may be confirmed graphically 82, as illustrated in FIG. 10. As illustrated in FIG. 10, this graphic confirmation 82 may, for example, overlap a map display for a limited period of time. Thus, FIG. 10 illustrates, for example, a bird's-eye view 80 of a suggested route 81 integrated into a 3-D graphical representation, via touch screen 21.

Figure 11:
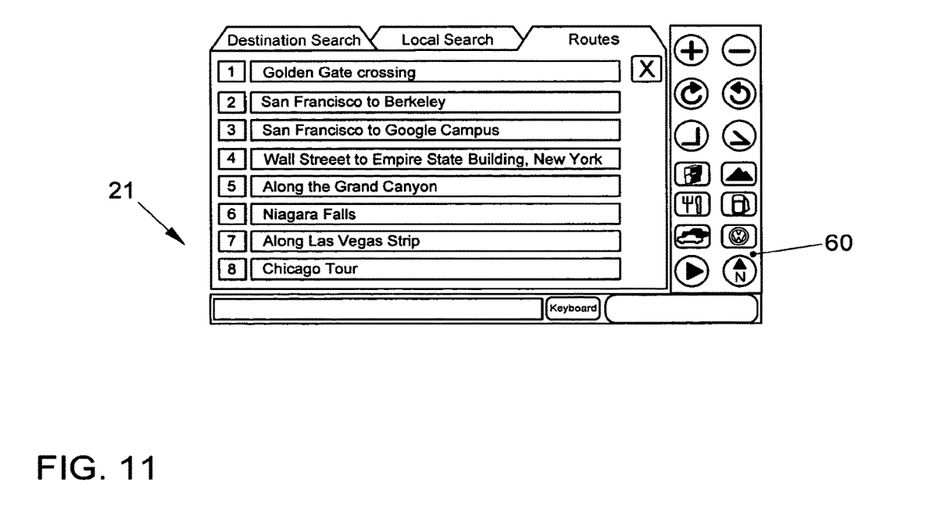
FIG. 11 illustrates a display of an overall view of a route, via a touch screen.

It may also be provided that preferred routes are selectable. FIG. 11 illustrates a display for selecting preferred routes via touch screen 21.

Automatic destination selection or at least interactively automatic destination selection may also be provided under certain conditions. Thus, it may be provided that motor vehicle 2 transmits operational data of motor vehicle 2 (e.g., via wireless communication device 7) or transmits operational data of the motor vehicle (e.g., via wireless communication connection 7) to off-board navigation system 5. In this regard, operating data of the motor vehicle may include the status of the fuel tank level, the oil level, or information regarding a defect, etc. If, for example, information that the tank is almost empty is transmitted, then navigation to the next gas station is offered and/or provided. If, for example, information that a specific defect is present is transmitted, then navigation to the next (e.g., suitable) service station is offered and/or provided.

Figure 12:
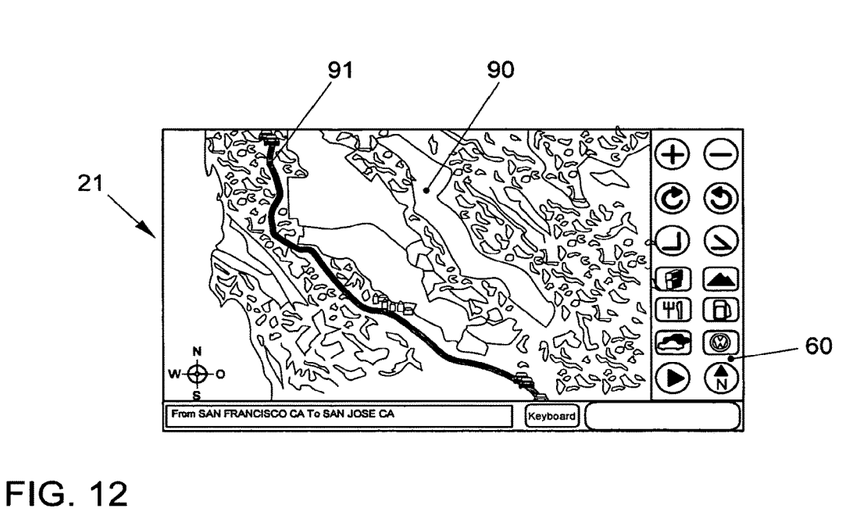
FIG. 12 illustrates a display for confirming a voice input via a touch screen.

FIG. 12 illustrates a display of an overall view of a route via touch screen 21. In this context, reference numeral 90 indicates a satellite image and reference numeral 91 indicates a suggested route. The overall view of a route may also be implemented in a fly-through mode, e.g., from a bird's-eye view.

Figure 13:
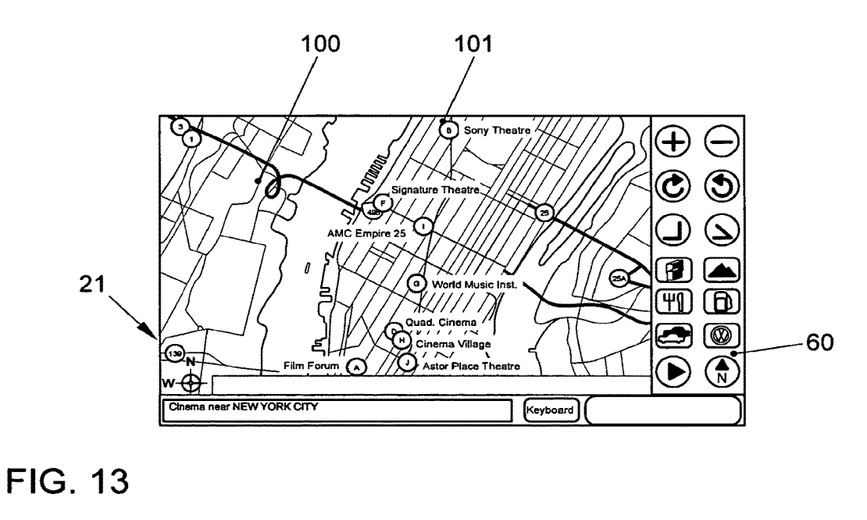
FIG. 13 illustrates a display of a satellite image supplemented with information, via a touch screen.

As illustrated in FIG. 13, satellite images 100 may also be superposed or supplemented with additional information 101, such as streets, street names or designations, buildings, vehicles, traffic information, POI's (e.g., optionally customized), call-out boxes, service areas, etc. Special references to service areas or parking areas may be provided, for example, when a specific driving time has been exceeded.

Figure 14:
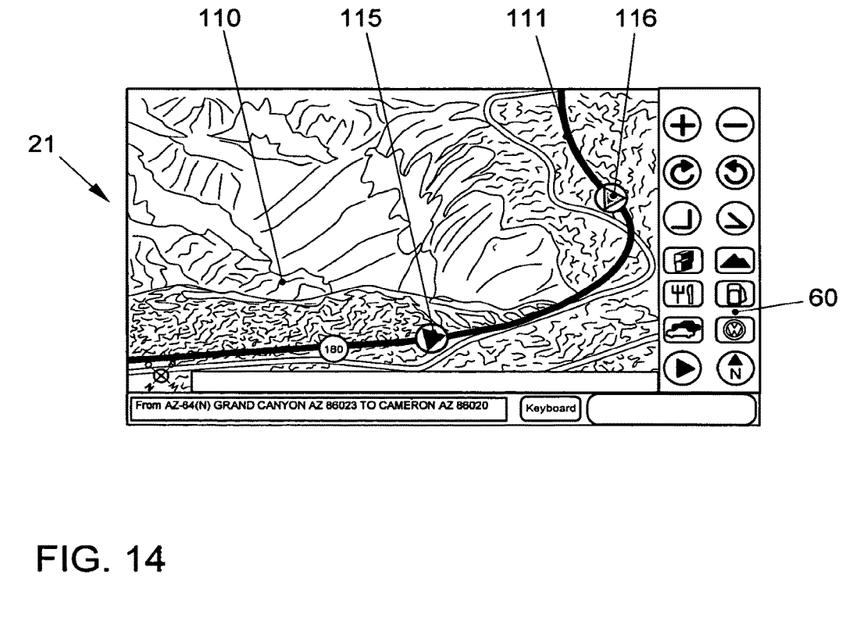
FIG. 14 illustrates a section of a display of a suggested route, together with a follow-me function.

As illustrated in FIG. 14, a follow-me function may also be provided in which position 116 of another selected motor vehicle is displayed on a map, a satellite image, and/or a 3-D graphical representation 110, e.g., together with position 115 of motor vehicle 2. In addition, a suggested route 111 may be displayed.

LIST OF REFERENCE SYMBOLS

1 Navigation System
2 Motor Vehicle
3 Satellite
4 Node
5 Off-Board Navigation System
6 Communication Network
7 Communication Connection
20 Display Control Unit
21 Touch Screen
22 Interface
23 On-Board Navigation System
24 Infotainment System
25 Telephone
26 Climate Control System
27 On-Board Sensor System
28 Memory
30 Position-Finding System
35 Bus System
40, 42, 46, 47 Inquiry
41, 43, 44, 45 Step
50 Marking
51, 90, 100 Satellite Image
52 Route
54 Streets
60 Toolbar
61a Plan View
61b, 80 Bird's-Eye View
62a, 62b, 81, 91, 111 Suggested Route
63 Points of Interest
70 Starting-Point Input Field
71 Destination Input Field
72 Keyboard
75 Object Input Field
76 Area Input Field
82 Graphic Confirmation
101 Additional Information
110 3-D Graphical Representation
115 Position of a Motor Vehicle
116 Position of Another Selected Motor Vehicle

What is claimed is:
1. A method for supporting navigation of a motor vehicle, comprising:
transmitting a suggested route integrated into at least one of (a) a satellite image or (b) a 3-D graphical representation from an off-board navigation system spatially separated from the motor vehicle to the motor vehicle via a wireless communication connection;

outputting the suggested route to an operator of the motor vehicle via a man-machine interface, the outputting including displaying the suggested route integrated into, the at least one of (a) the satellite image or (b) the 3-D graphical representation such that a viewing angle of (a) the satellite image or (b) the 3-D graphical representation is adjustable; and supplementing the outputted suggested route with information from an on-board sensor system.

2. The method according to claim 1, further comprising: determining a position of the motor vehicle by a position-finding system.

3. The method according to claim 2, further comprising: transmitting the position of the motor vehicle from the motor vehicle to the off-board navigation system via the wireless communication connection.

4. The method according to claim 1, wherein the outputting includes displaying the suggested route by a display device of the man-machine interface.

5. The method according to claim 1, further comprising: transmitting at least one of (a) the satellite image or (b) the 3-D graphical representation from an environment of the motor vehicle to the motor vehicle.

6. The method according to claim 5, wherein the outputting includes displaying the suggested route by a display device of the man-machine interface.

7. The method according to claim 1, further comprising: calculating the suggested route for the motor vehicle via an on-board navigation system.

8. The method according to claim 1, wherein the on-board sensor system includes at least one of a night vision sensor or a road-condition sensor.

9. The method according to claim 1, wherein the satellite view includes a night mode, a day mode, seasonal modes, and/or weather-dependent modes.

10. The method according to claim 1, wherein the viewing angle is adjustable between at an overhead view and a first-person view.

11. The method according to claim 10, wherein the viewing angle is adjustable by the operator of the motor vehicle.

12. A method for supporting navigation of a motor vehicle, comprising:

transmitting a suggested route integrated into at least one of (a) a satellite image or (b) a 3-D graphical representation from an off-board navigation system spatially separated from the motor vehicle to the motor vehicle via a wireless communication connection;

outputting the suggested route to an operator of the motor vehicle via a man-machine interface, the outputting including displaying the suggested route integrated into, the at least one of (a) the satellite image or (b) the 3-D graphical representation such that a viewing angle of (a) the satellite image or (b) the 3-D graphical representation is adjustable; and (a) automatically selecting or (b) interactively automatically selecting, by the off-board navigation system, a destination of the motor vehicle based on data of the motor vehicle transmitted from the motor vehicle to the off-board navigation system.

13. The method according to claim 12, wherein the data of the motor vehicle includes at least one of fuel tank level, oil level or defect information.

\* \* \* \* \*